Oct. 4, 1960  W. D. KELLY  2,955,190
CIRCUITOUS RESISTANCE PLATE TYPE ELECTRIC HEATER
Filed July 1, 1957  2 Sheets-Sheet 1

INVENTOR.
William D. Kelly
BY
Eugene M. Giles  Atty.

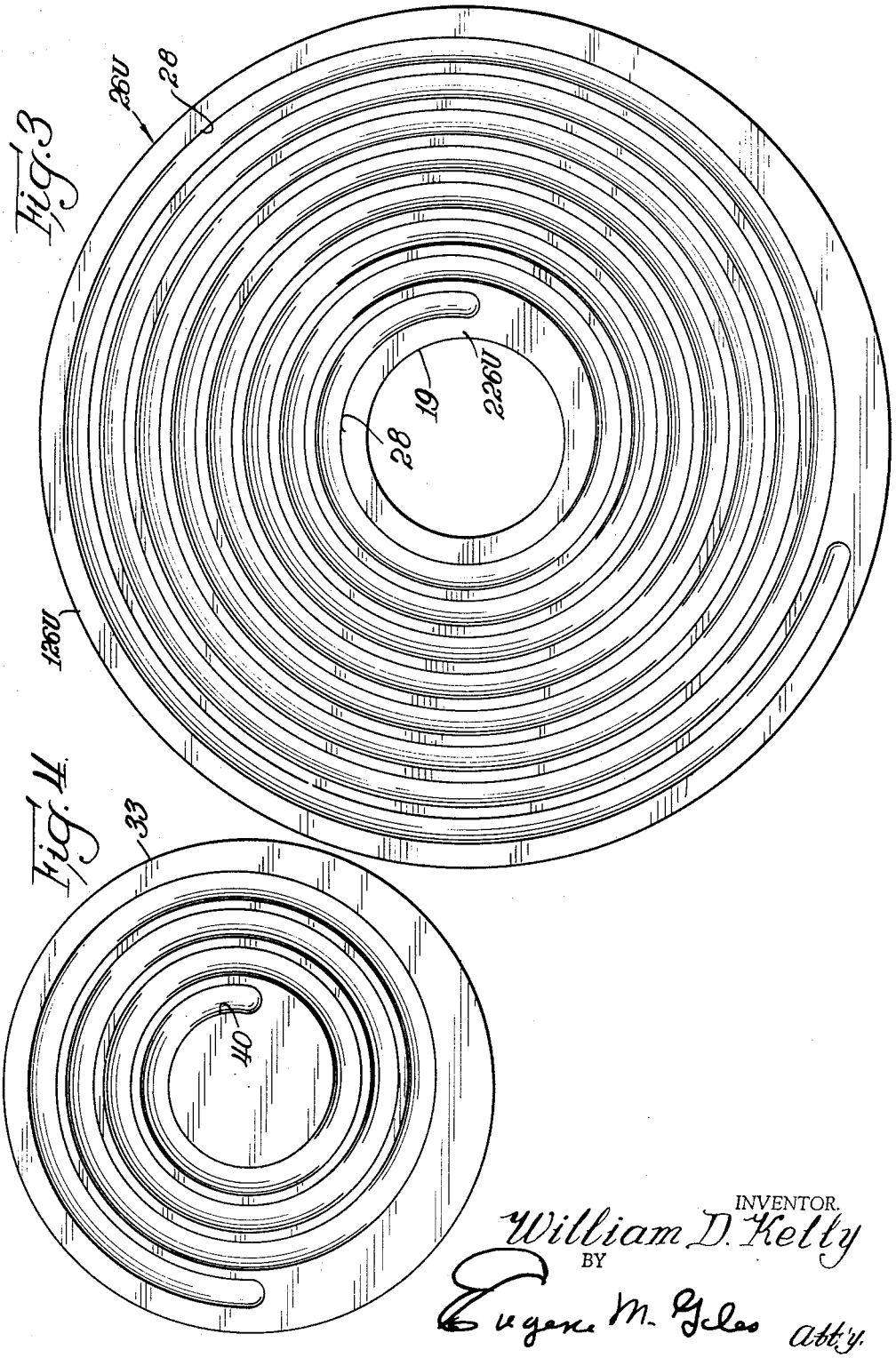

United States Patent Office

2,955,190
CIRCUITOUS RESISTANCE PLATE TYPE ELECTRIC HEATER

William D. Kelly, Western Springs, Ill., assignor, by mesne assignments, to Ferro Corporation, Cleveland, Ohio, a corporation of Ohio Filed July 1, 1957, Ser. No. 669,220

5 Claims. (Cl. 219—43)

This invention relates to electric heaters of the type wherein an elongated heating resistance is distributively arranged circuitously at or in one side of a plate supply heat to the opposite side face of the plate for cooking or similar purposes and has reference more particularly to a heater structure and method of making thereof wherein the resistance is distributively applied directly to one side of a plate or plate portion of heat conductive electrical insulating material which has a surface at the opposite side thereof from which heat is transmitted for cooking or similar purposes.

This application is a continuation in part of my application Serial No. 669,081 filed concurrently herewith on July 1, 1957, in which a heating resistance is enclosed and distributively applied circuitously to one side of a plate for transmission directly therethrough to a heating surface on the opposite side of the plate, the present application being of a different construction wherein cover means is applied to the plate to enclose the resistance after it is installed, and is more readily adaptable to certain heating applications.

The plate of the present construction, which may be the top of a hot plate heater on which cooking pans or utensils are placed for heating the contents thereof or may be the wall of or part of the wall of a receptacle or vessel in which food or other material is heated, is not only a good thermal conductor but also electrically non-conductive and the resistance is distributively applied directly to the plate at one side thereof, hereinafter referred to for convenience as the rear, so that the resistance is in contact with the plate and transmits heat directly thereto conductively, and the heat thus transmitted is conducted directly through the plate to the exposed face thereof at the opposite side, hereinafter referred to as the front, for conductive transfer from the exposed face directly to a cooking pan or utensil placed thereon or directly to the contents of a receptacle or vessel wherein the plate is the wall or a part of the wall thereof. Obviously such heater may be used for other purposes although it is particularly advantageous for cooking or the like.

The plate is made of a ceramic or similar material which may be shaped and solidified in the required form, for example, a high temperature glass such as those on the market under the trade name "Pyrex" and "Vycor" or the more recent material identified by the trade name "Pyroceram," and the plate is preferably formed with one or more channels in the rear thereof to accommodate the resistance or resistances therein in the desired circuitous configuration thereof with channel walls interposed between and close to the adjoining circuitous portions of the resistance for increased communication of heat to the front face of the plate, and the resistance is enclosed throughout its length conjointly by the ceramic plate and an attached cover at the rear to preclude access of liquid or spillage thereto. The cover is also of an electrically non-conductive material, preferably a porous ceramic which is an inefficient heat conductor.

Hot plate heaters have been made heretofore, for example for coffee making and cooking, with a pottery or porcelain utensil supporting block having the resistance therein, but these were of open coil type having the resistance in a circuitous groove in the top of the block so that the resistance was exposed through the open top of the groove for heating the pan or utensil thereon, the groove being relatively deep and the resistance suitably retained in the bottom thereof to avoid possible contact of the resistance with the pan or utensil on the top of the block.

Such heaters were not used extensively for general cooking purposes, because of possible shock and short circuit hazards, and it has been customary to employ heaters in which the resistance was completely enclosed. Some of these were in the form of a tube containing the resistor and bent into flat spiral or other circuitous form and some were of plate type with the resistance spirally or circuitously arranged underneath the plate, usually in grooves formed on the underside of the plate, in both of which types the resistance containing tube or the resistance covering plate was of metal and the resistance coil or coils were embedded in a heat conductive electrical insulating material so that it was completely enclosed by the insulation in which it is embedded and sufficiently separated thereby from the tube or plate to be safely insulated electrically therefrom.

In such heating units electrical insulating material of highly special character and exacting characteristics is required to insure adequate electrical insulation without objectional mass, and to provide appropriate heat conductivity from the resistance to the metal sheath or plate, and difficult manufacturing problems are encountered in providing adequate electrical insulation with a minimum of mass of electrical insulation for desired cooking speed and even under the most favorable conditions there is a certain amount of undesirable heating up delay which cannot be avoided.

The principal objects of the invention are to provide an improved electric heater of simple construction and high efficiency; to eliminate previous shock and short circuit hazards without special and difficult electrical insulation problems; to facilitate the introduction of the resistance into the heated plate or wall; to insure rapid heat transmission and visible observation of the heated resistance; to provide a construction capable of diversified applications; and to provide a simple and convenient method of making such heaters, these and other objects being accomplished as pointed out more particularly hereinafter and as shown in the accompanying drawing, in which:

Fig. 3 is a bottom plan view of the upper enclosure plate of the heater shown in Fig. 1, and;

Fig. 4 is a bottom plan view of the upper enclosure element of the heater illustrated in Fig. 2.

Figure 1:
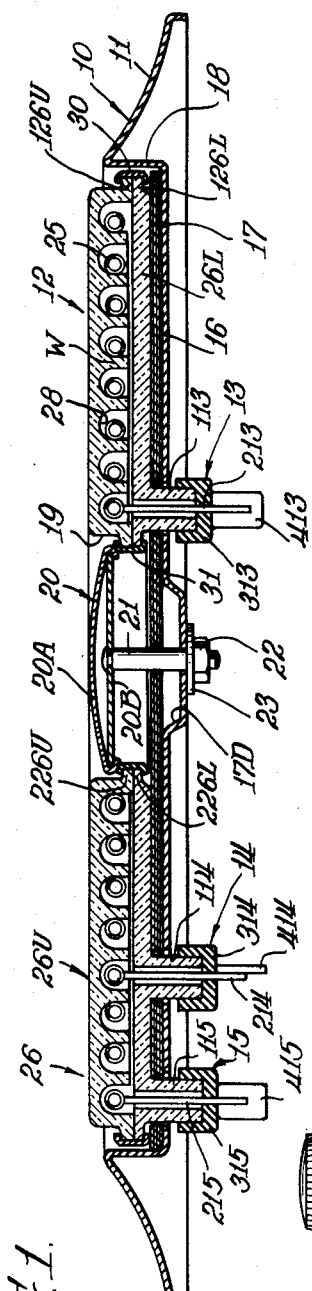
Fig. 1 is a vertical sectional view illustrating an enclosed resistance-type electric heater embodying the features of the invention.

For purposes of disclosure the invention is illustrated in Figs. 1 and 3 of the drawings as embodied in an enclosed resistance electric heater 10 having a supporting or mounting ring 11 in which an enclosed resistance heater unit 12 is supported with terminal structures 13, 14 and 15 projecting downwardly from the lower side of the heater unit. The heater unit 12 is supported in the mounting ring 11 on an insulating pad 16 that rests on a bottom wall 17, such bottom wall being connected by a vertical annular wall 18 to the inner edge of the mounting or supporting ring 11.

The heating unit 12 is annular in character and has a central opening 19 therein, and within this opening a filler button 20 is mounted. The filler button 20 comprises a convex upper member 20A and an interconnected lower wall 20B, and a mounting stem 21 extends axially down from the lower wall 20B so that by means of a nut 22 and a washer 23, the filler button 20 may be urged downwardly, and this is utilized, as will be described, to secure the heater unit 12 in position on the supporting ring 11. In the present instance, a central depression 17D is formed in the bottom wall 17 of the ring 11, and the washer 23 and the nut 22 are clamped against this depressed position 17D.

Under the present invention the heating unit 12 embodies an elongated electrical heating resistance that is illustrated in the form of a heating coil 25 that is enclosed and protected within a two-part ceramic body 26, and the heating coil 25 is disposed loosely within the ceramic body 26 in an elongated circuitous passage so that the heating coil 25 is fully enclosed and protected, and is in a firm heat-transmitting contact with the ceramic material. Thus, as shown particularly in Figs. 1 and 4, the heating unit 12 has upper and lower ceramic plates 26U and 26L, and the heat delivery surface is provided by a flat upper side surface on the plate 26U to which heat is to be conducted and distributed. In the other or lower face of the plate 26U a circuitous groove 28 is formed which provides a circuitous passage in which elongated heating resistance 25 may be disposed, and as shown herein the groove 28 is formed as a flat spiral of a plurality of turns, and the adjacent turns are separated by walls W. Thus when the heating resistance 25 is in position in the passage 28 its collateral portions are relatively close to each other and to the heat delivery surface so that heat from the resistance is transmitted evenly and efficiently to the heat delivery surface of the plate 26U. The plate 26U, being the member through which the heat is to be conducted to the heat delivery face of the unit, is made from a dense ceramic having good heat conductive properties, while the plate 26L which serves as a retaining or cover plate is preferably made from a somewhat porous ceramic wherein low heat conductivity will be attained. Moreover, the upper or heat conductive plate 26U in surface heating units and the like, is preferably made from a ceramic having at least some translucency so that the user may observe the heating of the resistance.

The two ceramic plates 26U and 26L are provided at their outer annular edges with annular flanges 126U and 126L that may be embraced by a metal clamping ring 30 which engages the outer end edges of the flanges and which is bent over at each edge so as to clamp the flange 126U and 126L together. About the opening 19, the upper and lower ceramic plates 126U and 126L are provided with engaged annular flanges 226U and 226L, and these two flanges are adapted to be engaged and clamped together by an inner clamping ring 31 that engages the ends of the flanges and has its edges bent over as by rolling so as to clamp the two flanges together. It is to be observed that the walls W are of such a dimension that when the upper and lower plates 26U and 26L are clamped together, the edges of the walls W are spaced a slight distance from the adjacent surface of the bottom ceramic plate 26L.

The heater 10, as disclosed in Figs. 1 and 3, is of the kind where the heating resistance 25 may be operated at two different levels of heat production, and it is for this reason that three terminal wires 13, 14 and 15 are illustrated in Fig. 1. It will be observed that in providing these terminals, the lower ceramic plate 26L has downwardly projecting tubular extensions in the form of nipples 113, 114 and 115 formed thereon so that the passages of these nipples open upwardly through the upper surface of the plate 26L. At the points where these nipples are to project downwardly in the fully assembled heater, the insulating pad P and the bottom wall 17 are formed with appropriate clearance openings therein.

In the production of the heating unit 12 under the present invention, the upper and lower ceramic plates 26U and 26L are completely formed and fired, and the heating coil 25 is put in position in the groove 28, after which the lower ceramic plate 26L is put in position and secured by means of the clamping rings 30 and 31.

The heating coil 25 has the usual terminal wires 213 and 215 connected to its opposite ends, while an intermediate terminal wire 214 is connected to an intermediate point in the heating coil 25 as shown in Fig. 1 of the drawings. The heating coil 25 is put in position in the groove 28 while the upper ceramic plate 26U is in an inverted position, and after the coil 25 is in place, the several terminal wires are extended through the respective nipples 113, 114 and 115, while the lower ceramic plate 26L is moved into position opposite or on top of the plate 26U so as to thereby hold the heating coil 25 in position. At this time, or after application of the clamping rings 30 and 31, the ends of the several terminal wires 213, 214 and 215 are passed through heat resistant sealing and anchoring cup 313, 314 and 315 that are made from a heat resistant material such as silicone material. After engaging these sealing and anchoring cups with the ends of the related nipples, and withdrawing the terminal wires the desired distance through the cups, anchoring terminal plates 413, 414 and 415 are welded onto the terminal wires so as to engage the outer ends of the cups 313 to 315. This holds terminal wires in an anchored position and maintains the several cups in the desired sealing relationship about and against the ends of the several nipples.

After the assembly of the heater 12 has thus been completed, the heater may be put in place on the wall 17 of the ring 11 and is anchored in this position by applying the filler cap 20 and clamping the same down onto the ring 31.

Figure 2:
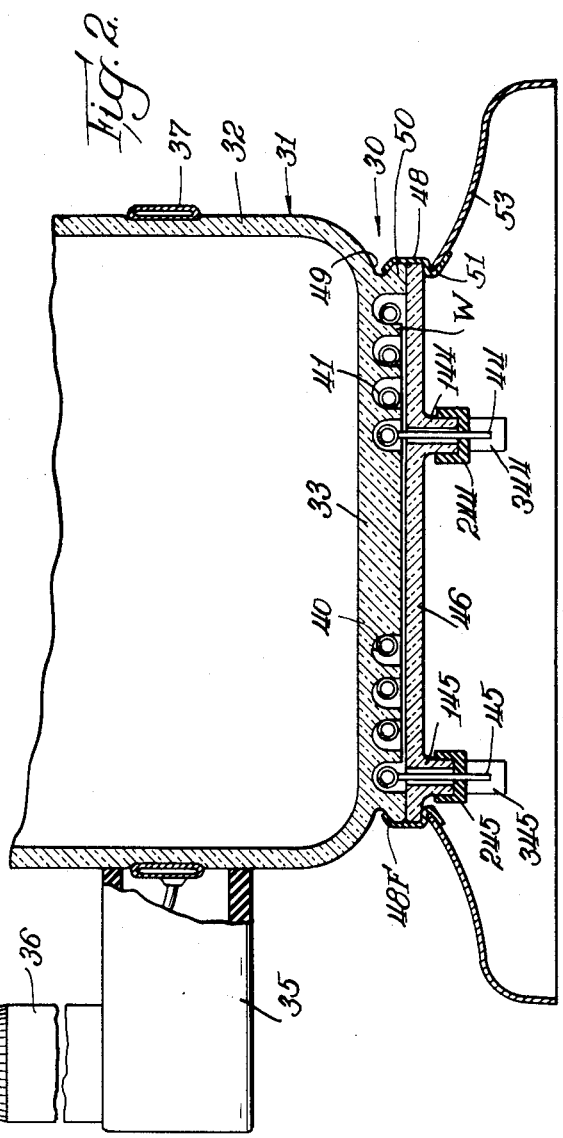
Fig. 2 is a fragmentary vertical sectional view illustrating a heater made under the invention and forming part of a heating or cooking vessel.

In Figs. 2 and 4 of the drawings the invention is illustrated as embodied in an enclosed resistance-type electric heater 30 that is formed in permanent association with or as a part of a heating utensil 31, and the heat transmitting part of the heater 30 is, in this instance, formed as an integral part of the utensil 31. Thus the utensil 31 is made from a ceramic material to provide a cylindrical side wall 32 and an integral and relatively thick bottom wall 33 that forms a part of the heater 30 as will be described in detail hereinafter.

The utensil 31, as herein shown, is provided with a control box 35 having a handle projecting upwardly therefrom with a control knob 36 at the upper end, and the control box 35 is held in position on one side of the utensil 31 by a flat and relatively thin tube 37 that embraces the side wall 32 and is filled with an expansible liquid so that the flattened tube 37 may serve not only as a mounting means for the control box 35, but may also act as a temperature sensing means for cooperation with the control means in the control box 35 in attaining control of the heater 30.

The bottom wall 33 of the utensil 31 has a circuitous passage 40 formed therein as a spiral groove in the lower surface of the wall and this groove or passage is adapted to receive a resistance heating coil 41 that extends throughout the length of the groove 40 and has terminal wires 44 and 45 extended from its ends. The heating coil 41 is enclosed or covered by a bottom or rear plate 46 that is also formed from ceramic material but which may have low heat conductive characteristics, and the plate 46 has a pair of nipples 144 and 145 extended downwardly therefrom in positions such that they may be located opposite the ends of the groove 40 in the assembled device. The nipples 144 and 145, of course, have openings extended through the upper surface of the bottom plate 46 so that the terminal wires 44 and 45 may be led downwardly through the nipples.

The heating coil 41 is put in position in the groove 40 while the utensil 31 is supported in an inverted position, and after this has been done, the terminal wires 44 and 45 are threaded through the appropriate nipples as the bottom plate 46 is put in position. It will be observed that when the bottom plate is engaged with the outer annular edge portion of the bottom wall 33, the adjacent surface of the bottom plate 46 is spaced slightly from the walls W that divide adjacent turns of the groove 40.

After the bottom plate 46 has been put in position, it is secured in position by a clamping ring 48. To enable this to be done, the bottom wall 33 has an annular groove 49 formed therein at its outer edge so that an annular clamping flange 50 is provided about and at the lower edge of the wall 33. The clamping ring 48, in this instance, has a reverse bend 51 thereon at its lower edge that provides a shoulder for engagement with the bottom surface of the plate 46, and this reverse bend portion of the clamping ring 45 is preferably attached by a welding to the upper annular edge of an enlarged base 53 that is formed from metal. The other or upper edge of the clamping band 48 originally is formed so that it may be slipped over the plate 46 and the flange 50, and this edge is then bent inwardly as by a rolling action to provide a clamping flange 50 of the bottom wall 33 to hold the plate 46 in position.

Either before or after the application of the clamping band 48, the terminal wires 44 and 45 are sealed and anchored with respect to the nipples 144 and 145. The sealing and anchoring action is provided by cups 244 and 245 that are made from a heat resistance material such as silicone composition, and these cups are put in place over the wires 44 and 45 and in embracing relationship to the nipples, and after tensioning of the heater coil 41, the terminal wires 44 and 45 are anchored by welding terminal plates 344 and 345 onto the extended portions of the terminal wires. Thus the terminal plates hold the sealing cups in position about the nipples 144 and 145.

While I have illustrated and described preferred embodiments and methods of my invention, it is to be understood that changes and variations may be made by those skilled in the art without departing from the spirit and scope of the appended claims.

What is claimed is:

1. A surface heating unit comprising a circuitously arranged helical resistance, and top and bottom plates between which the resistance is interposed and by which the resistance is circuitously confined and electrically insulated, the said top plate being substantially co-extensive with and supported on the bottom plate and having the top face thereof flat and exposed to provide a cooking surface, and means by which said plates are conjointly confined peripherally and between which peripheral edge portions of the plates are interposed and clamped to one another, the said plates having matching central openings containing a connector between upper and lower annular outturned portions of which the central opening defining margins of the plates are clamped.

2. A surface heating unit comprising a circuitously arranged helical resistance, and top and bottom plates between which the resistance is interposed and by which the resistance is circuitously confined and electrically insulated, the said top plate being substantially co-extensive with and supported on the bottom plate and having the top face thereof flat and exposed to provide a cooking surface, and means by which said plates are conjointly confined peripherally and between which peripheral edge portions of the plates are interposed and clamped to one another, the said plates having matching central openings containing an annular band with top and bottom annular flanges extending over the opening defining margins respectively of the top and bottom plates.

3. A surface heating unit comprising a circuitously arranged helical resistance, and top and bottom plates between which the resistance is interposed and by which the resistance is circuitously confined and electrically insulated, the said top plate being substantially co-extensive with and supported on the bottom plate and having the top face thereof flat and exposed to provide a cooking surface, and means by which said plates are conjointly confined peripherally and between which peripheral edge portions of the plates are interposed and clamped to one another, the said unit having a base plate underlying the bottom plate and said top and bottom plates have matching central openings and a cap covers said central openings and overlies the central opening defining margin of the top plate and is secured to said base plate.

4. A surface heating unit comprising a circuitously arranged helical resistance, and top and bottom plates between which the resistance is interposed and by which the resistance is circuitously confined and electrically insulated, the said top plate being substantially co-extensive with and supported on the bottom plate and having the top face thereof flat and exposed to provide a cooking surface, and means by which said plates are conjointly confined peripherally and between which peripheral edge portions of the plates are interposed and clamped to one another, the said unit having a mounting member by which it is supported, said member having an upright annular wall within which said means is confined, said annular wall having an external annular flange around the top thereof and said annular wall having at the bottom an integral wall extending underneath the said bottom plate of the heating unit.

5. A surface heating unit comprising a circuitously arranged helical resistance, and top and bottom plates between which the resistance is interposed and by which the resistance is circuitously confined and electrically insulated, the said top plate being substantially co-extensive with and supported on the bottom plate and having the top face thereof flat and exposed to provide a cooking surface, and means by which said plates are conjointly confined peripherally and between which peripheral edge portions of the plates are interposed and clamped to one another, the said means having a skirt therearound and extending outwardly and downwardly therefrom to provide a supporting base by which the plates are supported at an elevation.

References Cited in the file of this patent

UNITED STATES PATENTS

| | | |
|---|---|---|
| 1,475,760 | Fay | Nov. 27, 1923 |
| 2,010,768 | Morgan | Aug. 6, 1935 |
| 2,012,977 | Trent et al. | Sept. 3, 1935 |
| 2,101,095 | Price | Dec. 7, 1935 |
| 2,152,126 | Young | Mar. 28, 1939 |
| 2,177,173 | Dadson | Oct. 24, 1939 |
| 2,179,934 | Jones | Nov. 14, 1939 |
| 2,182,319 | Owen | Dec. 5, 1939 |
| 2,217,465 | Barnsteiner et al. | Oct. 8, 1940 |
| 2,611,070 | Chandler | Sept. 16, 1952 |
| 2,785,277 | Jepson | Mar. 12, 1957 |
| 2,799,765 | Jenkins et al. | July 16, 1957 |

FOREIGN PATENTS

| | | |
|---|---|---|
| 436,696 | Great Britain | Oct. 16, 1935 |